US009481453B2

(12) United States Patent
Luce

(10) Patent No.: US 9,481,453 B2
(45) Date of Patent: Nov. 1, 2016

(54) SHRINKING SYSTEM FOR LANDING GEAR

(71) Applicant: Goodrich Corporation, Charlotte, NC (US)

(72) Inventor: William E Luce, Colleyville, TX (US)

(73) Assignee: Goodrich Corporation, Charlotte, NC (US)

( * ) Notice: Subject to any disclaimer, the term of this patent is extended or adjusted under 35 U.S.C. 154(b) by 374 days.

(21) Appl. No.: 14/231,004

(22) Filed: Mar. 31, 2014

(65) Prior Publication Data

US 2015/0274283 A1    Oct. 1, 2015

(51) Int. Cl.
*B64C 25/22*    (2006.01)
*B64C 25/26*    (2006.01)

(52) U.S. Cl.
CPC .............. *B64C 25/22* (2013.01); *B64C 25/26* (2013.01)

(58) Field of Classification Search
CPC ................ F15B 11/072; F15B 15/261; F15B 2211/7055; F15B 2211/72
See application file for complete search history.

(56) References Cited

U.S. PATENT DOCUMENTS

| 5,908,174 A * | 6/1999 | Churchill | B64C 25/18 244/102 SS |
| 8,070,095 B2 * | 12/2011 | Luce | B64C 25/14 244/102 SS |
| 8,739,682 B2 * | 6/2014 | Dreyer | B60R 21/34 92/15 |
| 2007/0221783 A1 * | 9/2007 | Parks | G06Q 30/08 244/102 A |
| 2010/0219290 A1 | 9/2010 | Luce | |
| 2012/0137654 A1 * | 6/2012 | Burgess | F02K 1/06 60/204 |
| 2012/0187239 A1 * | 7/2012 | Martin | B64C 25/50 244/50 |
| 2013/0119196 A1 | 5/2013 | Lindahl et al. | |
| 2014/0138890 A1 * | 5/2014 | Kawakami | F15B 15/2807 269/27 |

FOREIGN PATENT DOCUMENTS

| DE | 1206316 B | * 12/1965 | ............ F15B 15/261 |
| DE | 2034634 A1 | * 1/1972 | ............ F15B 15/261 |
| DE | 2952235 A1 | * 7/1981 | ............ F15B 15/261 |
| FR | WO 2009150376 A2 | * 12/2009 | ............ B64C 25/14 |
| GB | 899514 A | * 6/1962 | ............ F15B 15/261 |
| GB | 2483472 | 3/2012 | |
| GB | 2483734 | 3/2012 | |
| PL | WO 2007084018 A1 | * 7/2007 | ............ F15B 15/261 |

OTHER PUBLICATIONS

Extended European Search Report dated Aug. 25, 2015 in European Application No. 15158565.0.

* cited by examiner

*Primary Examiner* — John K Fristoe, Jr.
*Assistant Examiner* — Matthew Wiblin
(74) *Attorney, Agent, or Firm* — Snell & Wilmer L.L.P.

(57) ABSTRACT

Landing gear actuator systems and methods are disclosed. A landing gear actuator system may have an actuator body, an operating apparatus, a gas pressure adjustment apparatus, and a hydraulic fluid adjustment apparatus. The gas pressure adjustment apparatus may adjust at least one gas pressure in response to the operating apparatus. The hydraulic fluid adjustment apparatus may adjust at least one hydraulic fluid volume in response to the operating apparatus. The gas pressure and the hydraulic fluid volume may adjusted inversely. An isolation valve may be installed between the gas pressure adjustment apparatus and a strut gas chamber of a landing gear. In this manner, a landing gear strut may be shrunk without inducing high pressure in the strut, and stowed for flight, and a landing gear strut may be unshrunk and isolated by the valve to protect the actuator from high pressure and reaction forces during landing.

14 Claims, 5 Drawing Sheets ously embodiments;
SHRINKING SYSTEM FOR LANDING GEAR

FIELD

The present disclosure relates to landing gear systems and, more specifically, to a shrinking system for use with a landing gear.

BACKGROUND

Aircraft wheel wells are frequently too small to fit an extended landing gear strut. Thus, landing gear struts are often compressed as the landing gear is retracted into the wheel well. However, upon retraction, the load associated with retaining the high pressure inside the compressed landing gear strut is often very large. This pressure limits the possible stroke of the strut available to be utilized during a compression or shrinking event and presents a hazard wherein an inadvertent extension of the strut inside the wheel well may occur in the event that the compression mechanism gives way.

SUMMARY

In various embodiments, a landing gear actuator system is disclosed. In accordance with various embodiments, a landing gear actuator system may have an actuator body, an operating apparatus, a gas pressure adjustment apparatus, a hydraulic fluid adjustment apparatus, wherein the gas pressure adjustment apparatus adjusts a gas volume in response to the operating apparatus, wherein the hydraulic fluid adjustment apparatus adjusts a hydraulic fluid volume in response to the operating apparatus, and wherein the gas volume and the hydraulic fluid volume are adjusted inversely.

In some embodiments, a landing gear actuator system may also have an operating apparatus having a hydraulic fluid drive reservoir and a piston member, wherein the piston member is translatable in response to the introduction of hydraulic fluid in the hydraulic fluid drive reservoir, wherein the gas pressure adjustment apparatus has a gas storage reservoir, wherein the hydraulic fluid adjustment apparatus has a hydraulic fluid storage reservoir, wherein the piston member is disposed between the hydraulic fluid storage reservoir and the gas storage reservoir such that a translation of the piston member inversely changes the volume of the hydraulic fluid storage reservoir and the volume of the gas storage reservoir with respect to one another.

In accordance with various embodiments, a method of operating a landing gear actuator system may include actuating a piston member in response to the introduction of hydraulic fluid into a hydraulic fluid driver reservoir, moving hydraulic fluid between a landing gear strut shrink chamber and a hydraulic fluid storage reservoir in response to the actuating, moving gas between a gas storage reservoir and a landing gear strut gas chamber in response to the actuating, and causing a landing gear strut to at least one of shrink and unshrink in response to the actuating.

BRIEF DESCRIPTION OF THE DRAWINGS

The subject matter of the present disclosure is particularly pointed out and distinctly claimed in the concluding portion of the specification. A more complete understanding of the present disclosure may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. As used herein, phrases such as "make contact with," "coupled to," "touch," "interface with" and "engage" may be used interchangeably.

Figure 1:
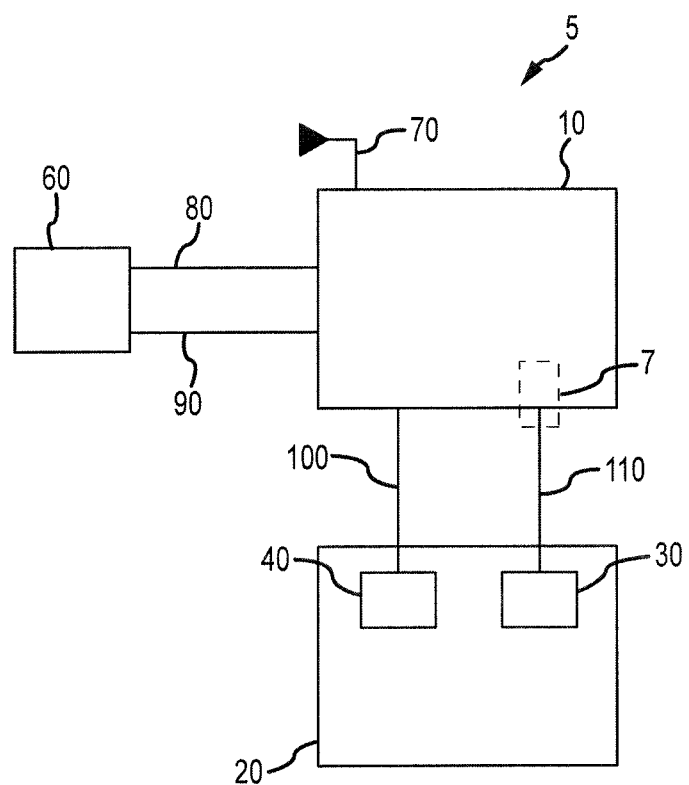
FIG. 1 illustrates a block diagram of various aspects of a shrinking system for landing gear, in accordance with various embodiments.

In various embodiments, an aircraft landing gear actuator system may comprise aircraft sequence valve, an actuator, and a landing gear. For example, with reference to FIG. 1, in various embodiments of an aircraft 5, an aircraft sequence valve 60 commands the aircraft's hydraulic supply to shrink/unshrink the strut and lock/unlock the strut by controlling hydraulic inputs to a landing gear actuator system 10. For example, the aircraft sequence valve may provide hydraulic fluid to control the landing gear actuator system 10 via conduit 80 and may provide hydraulic fluid to lock/unlock the strut via conduit 90.

Landing gear actuator system 10 is in hydraulic communication with landing gear 20. As discussed further herein, in various embodiments, a landing gear 20 comprises a landing gear strut shrink chamber 40 and a landing gear strut gas chamber 30. For instance, landing gear actuator system 10 is connected by conduit 100 to a landing gear strut shrink chamber 40 and landing gear actuator system 10 is connected by conduit 110 to landing gear strut gas chamber 30. In various embodiments, landing gear actuator system 10 comprises a strut gas pressure isolation valve 7 disposed in hydraulic communication with conduit 110. In this manner, the landing gear strut gas chamber 30 may be isolated from other system components, for example, from other components of landing gear actuator system 10. This may be advantageous during times in which the landing gear strut gas chamber 30 reacts significant force, for example, large impulse forces upon the landing gear 20 when the aircraft lands. Moreover, in various embodiments, landing gear actuator system 10 may comprise an atmospheric relief vent 70. This may be advantageous to vent unwanted pressures or vacuums from within landing gear actuator system 10.

In various embodiments, a landing gear may comprise a strut body, a strut piston, a gas chamber, and hydraulic shrink chamber. For example, with reference to FIG. 8, a landing gear may comprise a strut body 130, a strut piston 120, landing gear strut shrink chamber 40, and a landing gear strut gas chamber 30. In accordance with principles disclosed herein, hydraulic fluid is pumped into landing gear strut shrink chamber 40 via conduit 100. The hydraulic fluid compresses the strut piston 120 into strut body 130, increasing the volume of landing gear strut shrink chamber 40, and decreasing the volume of landing gear strut gas chamber 30. This in turn exerts a compression force on the gas inside landing gear strut gas chamber 30, causing the gas to seek to exit the chamber through conduit 110. In various stages of operation, landing gear actuator system 10 and its various components may permit gas to escape through conduit 110 into a reservoir component of landing gear actuator system 10 (specifically, the gas storage reservoir 12, as discussed further herein with reference to FIGS. 2 and 3). In this manner, landing gear 20 is permitted to shrink upon retraction without causing a high internal gas pressure, as the gas pressure is permitted to bleed off into landing gear actuator system 10 via conduit 110. In various stages of operation, for example, when it is desirous for landing gear strut gas chamber 30 to provide for the landing gear to support the aircraft, for example, for landing and/or taxi and/or parking, or otherwise while the aircraft is on the ground, landing gear actuator system 10 seals off the conduit 110, preventing the gas from escaping through conduit 110 (for example, by strut gas pressure isolation valve 7, as discussed further herein and with reference to FIGS. 4 and 5). In this manner, landing gear actuator system 10 may variously alter the hydraulic pressure and the gas pressure within the landing gear strut shrink chamber 40 and the landing gear strut gas chamber 30 thereby causing the landing gear variously to seek to shrink if no external load is placed on it, or causing the landing gear to seek to expand if no external load is placed on it, or causing the landing gear to remain in static position if no external load is placed on it, in response to various configurations of landing gear actuator system 10.

In various embodiments, landing gear actuator system 10 may comprise an actuator body, an operating apparatus, a gas pressure adjustment apparatus, and a hydraulic fluid adjustment apparatus wherein the gas pressure adjustment apparatus adjusts at least one gas pressure/volume and the hydraulic fluid adjustment apparatus adjusts at least one hydraulic fluid pressure/volume wherein each adjusting is in response to the operating apparatus, and wherein the gas pressure/volume is adjusted inversely with respect to the hydraulic fluid pressure/volume.

For example, with reference back to FIG. 1, a landing gear actuator system 10 may comprise an actuator body, an operating apparatus comprising a hydraulic fluid drive reservoir, a hydraulic fluid adjustment apparatus comprising a hydraulic fluid storage reservoir, a gas pressure adjustment apparatus comprising a gas storage reservoir. An operating apparatus may further comprise a piston locking apparatus and a piston member, wherein the piston member separates the hydraulic fluid storage reservoir from the gas storage reservoir.

In various embodiments, the piston member is actuated by the introduction of hydraulic fluid in to the hydraulic fluid drive reservoir. In various embodiments, the piston locking apparatus is disposed within the actuator body and locks and unlocks the piston member at one or more orientations, for example, fully extended, fully retracted, or both.

Figure 2:
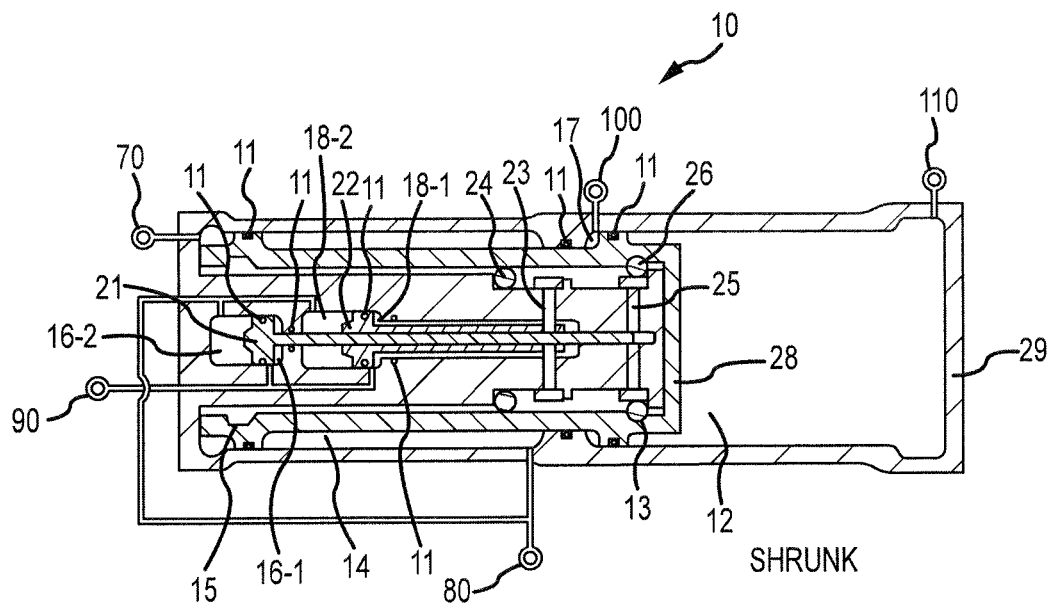
FIG. 2 illustrates a cut away view of various aspects of an actuator for a shrinking system for landing gear in a shrunk configuration, in accordance with various embodiments.
Figure 3:
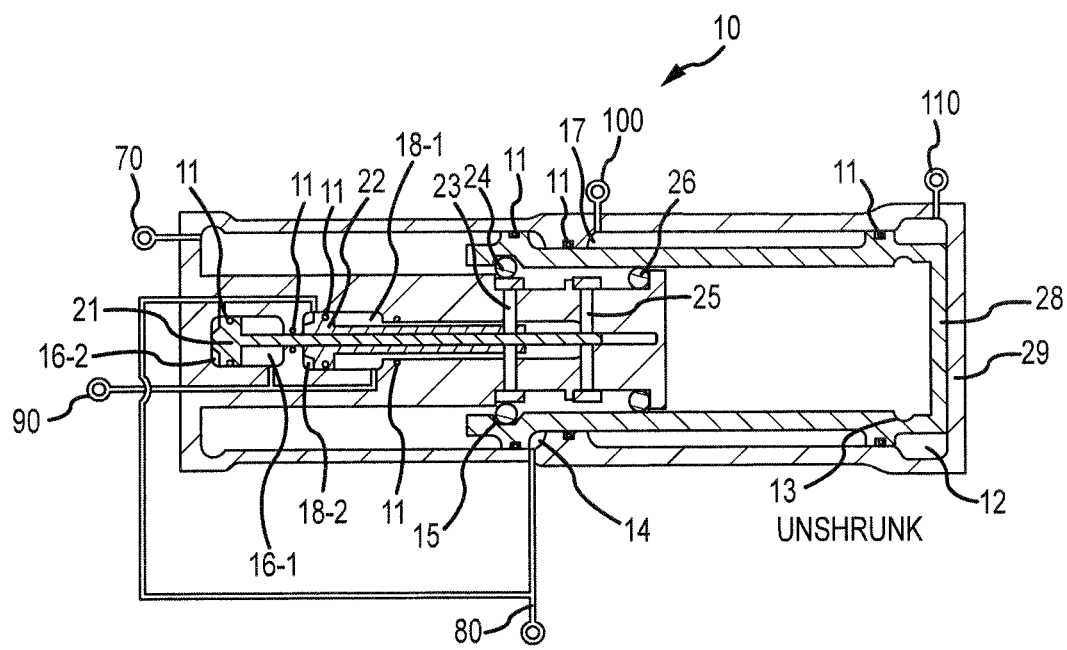
FIG. 3 illustrates a cut away view of various aspects of an actuator for a shrinking system for landing gear in an unshrunk configuration, in accordance with various embodiments.

For example, with reference to FIGS. 2 and 3, a landing gear actuator system 10 may comprise an actuator body 29 comprising a gas storage reservoir 12 and a hydraulic fluid storage reservoir 17 separated by a piston member 28. A seal 11 may be disposed at various surface junctures throughout the actuator whereby different portions are effectively sealed, for example, along the surface of piston member 28.

In various embodiments, a seal 11 comprise a pair of O-rings with a leakage path disposed between the two O-rings. For example, as discussed further herein, in various aspects of a landing gear actuator system 10, it is desirable for isolation between chambers to be maintained, even in the event that an O-ring fails. For example, a leakage path may be disposed between the O-rings so that if either O-ring fails, pressure and/or fluid may be vented via the leakage path, rather than compromising the isolation of various chambers. For example, with reference to various aspects of a landing gear actuator system 10 discussed herein, it is desirous for the aircraft hydraulic system and the hydraulic fluid within hydraulic fluid storage reservoir 17 of a landing gear actuator system 10 to be mutually isolated.

Figure 4:
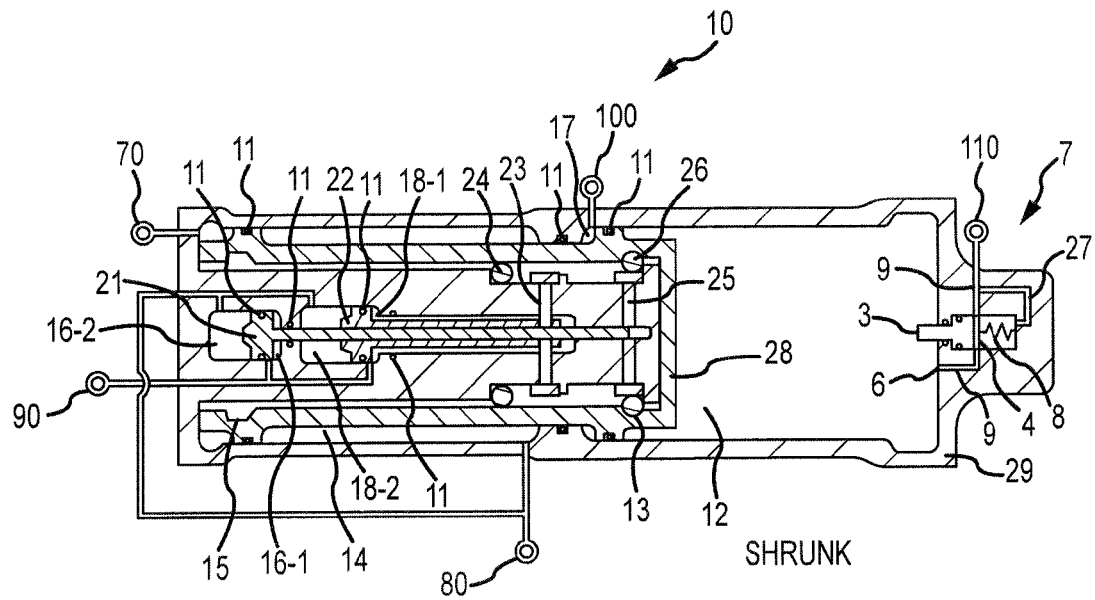
FIG. 4 illustrates a cut away view of various aspects of an actuator for a shrinking system for landing gear in a shrunk configuration and having a strut pressure isolation valve, in accordance with various embodiments.
Figure 5:
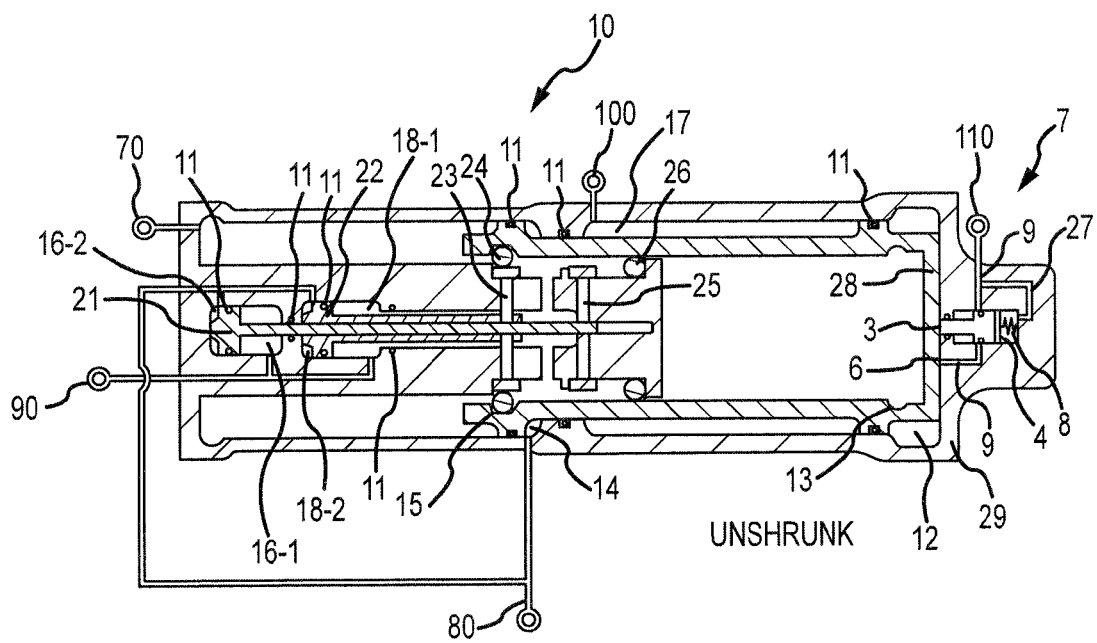
FIG. 5 illustrates a cut away view of various aspects of an actuator for a shrinking system for landing gear in an unshrunk configuration and having a strut pressure isolation valve, in accordance with various embodiments.

In various embodiments, the landing gear actuator system 10 further comprises a strut gas pressure isolation valve 7 disposed at one end of gas storage reservoir 12 (FIGS. 4 and 5). With additional reference to FIGS. 1, 4, 5, and 8, in this manner, gas storage reservoir 12 may be isolated from the landing gear 20, particularly, the landing gear strut gas chamber 30 connected via conduit 110 to gas storage reservoir 12 of landing gear actuator system 10 may be isolated from gas storage reservoir 12 of landing gear actuator system 10.

With renewed reference to FIGS. 2 and 3, in various embodiments, the piston locking apparatus may operate to lock the piston at a desired position. In various embodiments, the piston locking apparatus comprises a forward lock actuation shaft 21 and an aft lock actuation shaft 22, wherein the forward lock actuation shaft mechanically communicates with forward lock 25, and wherein the aft lock actuation shaft 22 mechanically communicates with aft lock 23. In various embodiments, forward lock actuation shaft 21 mechanically drives the forward lock 25 to dispose a forward radial locking ring 26 into a corresponding forward locking groove 13 in piston member 28. Similarly, in various embodiments, aft lock actuation shaft 22 mechanically drives the aft lock 23 to dispose an aft radial locking ring 24 into a corresponding aft locking groove 15 in piston member 28. In this manner, by controlling the different lock actuation shafts, via hydraulic fluid conducted from aircraft sequence valve 60 through conduit 90 to landing gear actuator system 10, the different locks may be engaged whereby the piston member may be locked in position at one of its terminal positions. In various embodiments, forward lock 25 locks the piston member 28 in position fully aft so that gas storage reservoir 12 is maximized. In various embodiments, aft lock 23 locks the piston member 28 in position fully forward so that gas storage reservoir 12 is minimized. In various embodiments, additional locks may be implemented, or different locking grooves may be implemented, whereby the piston member may be locked in a variety of different positions, for example, to achieve different landing gear extensions, and different landing gear gas pressures. In various embodiments, the forward lock 25 is located closer to the piston member 28 than the aft lock 23. Thus, in various embodiments, as used herein, "forward" means closer to the piston member 28, while "aft" means farther from the piston member 28.

In various embodiments, piston member 28 translates axially within actuator body 29. With continuing reference to FIGS. 2 and 3, as well as with reference to FIG. 8, in various embodiments, a landing gear actuator system 10 may operate to, place a landing gear in a shrunk condition (FIG. 2), or to place a landing gear in an unshrunk condition (FIG. 3). For example, with particular reference to FIG. 2, a landing gear actuator system 10 may be operated to place a landing gear in a shrunk condition, for example, in order to be stored in an aircraft gear well.

Prior to translation of piston member 28, and then following the translation of piston member 28, forward lock 25 and/or aft lock 23 may be engaged and need to be disengaged to permit piston member 28 to move. In various embodiments, hydraulic fluid may be pumped via conduit 90 into or out of forward lock actuation cavity 16-1 and aft lock actuation cavity 18-1 and similarly via conduit 80 into or out of forward lock actuation cavity 16-2 and aft lock actuation cavity 18-2. In this manner, the locks may be disengaged or engaged. More specifically, the forward lock actuation shaft 21 may mechanically drive the forward lock 25 to engage or disengage forward radial locking ring 26 from corresponding forward locking groove 13 in piston member 28, and the aft lock actuation shaft 22 may mechanically drive the aft lock 23 to engage or disengage aft radial locking ring 24 from a corresponding aft locking groove 15 in piston member 28. Thus the locks may assume the arrangement illustrated in FIG. 2, or in FIG. 3, or any other arrangement.

In preparation for operating the landing gear actuator system 10 to place a landing gear in a shrunk condition, hydraulic fluid may be pumped via conduit 90 into aft lock actuation cavity 18-1, and optionally into forward lock actuation cavity 16-1 and/or via conduit 80 out of aft lock actuation cavity 18-2, and/or optionally out of forward lock actuation cavity 16-2. In this manner, the locks may be disengaged. More specifically, the aft lock actuation shaft 22 may mechanically drive the aft lock 23 to disengage aft radial locking ring 24 from a corresponding aft locking groove 15 in piston member 28.

Hydraulic fluid may be pumped via conduit 80 into hydraulic fluid drive reservoir 14. In various embodiments, hydraulic fluid drive reservoir 14 may be positioned annually about a circumferential portion of piston member 28 so that when hydraulic fluid drive reservoir 14 is filled, hydraulic pressure may be exerted on piston member 28 and draw the piston member 28 aft to a fully aft position as illustrated in FIG. 2. Correspondingly, as the piston member 28 is drawn aft to a fully aft position, the volume of gas storage reservoir 12 may be increased as the piston member 28 translates, thus lowering the gas pressure within conduit 110. In various embodiments, an actuator body 29 may comprise an atmospheric relief vent 70 whereby unwanted gas pressure or vacuum pressure caused within a portion of the hydraulic fluid drive reservoir 14 may be vented.

Figure 8:
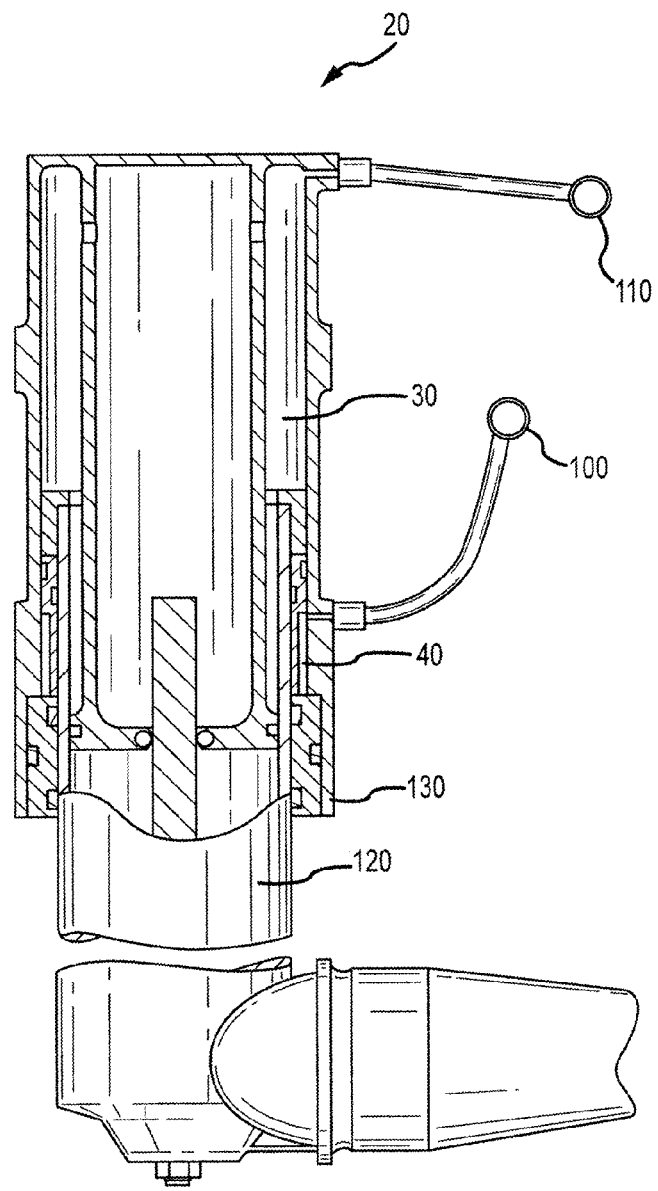
FIG. 8 illustrates a cut away view of various aspects of a landing gear strut shrink chamber and a landing gear strut gas chamber for a shrinking system for landing gear, in accordance with various embodiments.

With continuing reference to FIGS. 2 and 3 and with additional reference to FIG. 8, translation of the piston member 28 correspondingly reduces the volume of the landing gear strut gas chamber 30. Simultaneously, the volume of the hydraulic fluid storage reservoir 17 may be decreased as the piston member 28 translates, thus forcing hydraulic fluid to flow in conduit 100. This correspondingly forces hydraulic fluid into landing gear strut shrink chamber 40. As a person having ordinary skill in the art will appreciate, this simultaneous introduction of hydraulic fluid into landing gear strut shrink chamber 40 and reduction of gas pressure within conduit 110 work to cause the landing gear strut to shrink, but without an accumulation of high internal pressure. In this regard, the force reacted by the landing gear strut components when shrunk may be diminished.

In various embodiments, as discussed in detail herein, the landing gear strut shrink chamber 40, the landing gear strut gas chamber 30, the hydraulic fluid storage reservoir 17, and the gas storage reservoir 12 may be sized so that the internal gas pressure in landing gear strut gas chamber 30 is decreased, for example, to provide desired shrinkage characteristics, such as a desired shrunk operating pressure, shrunk strut length, and otherwise to facilitate the stowage of the landing gear in a landing gear wheel well.

Subsequently, hydraulic fluid may be pumped via conduit 90 out of forward lock actuation cavity 16-1 or via conduit 80 into forward lock actuation cavity 16-2. In this manner, the forward lock actuation shaft 21 may mechanically drive the forward lock 25 to engage forward radial locking ring 26 into the corresponding forward locking groove 13 in piston member 28. In various embodiments, however, any combination of locking grooves may be implemented and the appropriate locks engaged. In this manner, the locking apparatus may lock the piston member 28 in the shrunk position, so that any hydraulic forces or gas forces transmitted from the landing gear 20 may be reacted with the actuator body 29, thereby reducing wear on other system components, for example, with momentary reference to FIG. 1, conduit 80, conduit 90 and aircraft sequence valve 60.

Thus, with reference to FIGS. 2 and 3, in various embodiments, to operate a landing gear actuator system 10 to place a landing gear in a shrunk position (FIG. 2), from an unshrunk position (FIG. 3), a method may proceed as follows. Apply pressure to conduit 80 which communicates with aft lock actuation cavity 18-2 and forward lock actuation cavity 16-2 simultaneously. Pressure in aft lock actuation cavity 18-2 will move aft lock actuation shaft 22, which moves aft lock 23 and allows aft radial locking ring 24 to become disengaged from aft locking groove 15, thereby disengaging the aft lock from holding the actuator in the unshrunk position. The pressure in the forward lock actuation cavity 16-2 tries to move the piston member 28 but it is stalled because forward lock 25 cannot move under forward radial locking ring 26 as it is trapped by the inside diameter of piston member 28. This pressure also communicates with hydraulic fluid drive reservoir 14 and pulls piston member 28 from the unshrunk position (FIG. 3) to the shrunk position (FIG. 2). While doing this, gas storage reservoir 12 expands which is in communication via conduit 110 to the landing gear strut gas chamber 30 (FIG. 8). Once the piston member 28 reaches the shrunk position (FIG. 2), the continued pressure on conduit 80 (which is in communication with forward lock actuation cavity 16-2) will move forward lock 25 under forward radial locking ring 26 forcing it to engage forward locking groove 13 and lock the piston member 28 into the shrunk position (FIG. 2). Removal of pressure from conduit 80 does not impact position of shrink actuator or strut.

Now, having discussed a landing gear actuator system 10 operated to place a landing gear in a shrunk condition, with particular reference to FIG. 3, a landing gear actuator system 10 may also be operated to place a landing gear in an unshrunk condition, for example, in order to provide for the landing gear to support the aircraft, for example, for landing and/or taxi and/or parking or otherwise while on the ground. Hydraulic fluid may be pumped via conduit 90 into forward lock actuation cavity 16-1. In this manner, the forward lock actuation shaft 21 may mechanically drive the forward lock 25 to disengage forward radial locking ring 26 from corresponding forward locking groove 13 in piston member 28.

Hydraulic fluid may be pumped via conduit 80 out of hydraulic fluid drive reservoir 14. In this manner, hydraulic pressure may be exerted on piston member 28 and draw the piston member 28 forward to a fully forward position as illustrated in FIG. 3. Correspondingly, the volume of gas storage reservoir 12 may be decreased as the piston member 28 translates, thus increasing the gas pressure within conduit 110. With additional reference to FIG. 8, this correspondingly increases the gas pressure within landing gear strut gas chamber 30. Simultaneously, the volume of the hydraulic fluid storage reservoir 17 may be increased as the piston member 28 translates, thus forcing hydraulic fluid to flow through conduit 100 and into hydraulic fluid storage reservoir 17. In various embodiments, an actuator body 29 may comprise an atmospheric relief vent 70 whereby unwanted gas pressure or vacuum pressure caused within a portion of the hydraulic fluid drive reservoir 14 may be vented.

With additional reference to FIG. 8, translation of the piston member 28 correspondingly draws hydraulic fluid from landing gear strut shrink chamber 40. As a person having ordinary skill in the art will appreciate, this simultaneous drawing of hydraulic fluid from landing gear strut shrink chamber 40 and increase of gas pressure within conduit 110 work to cause the landing gear strut to expand, but without a diminution of internal gas pressure. In various embodiments, the landing gear strut shrink chamber 40, the landing gear strut gas chamber 30, the hydraulic fluid storage reservoir 17, and the gas storage reservoir 12 are sized, as discussed in detail herein, so that the internal gas pressure in landing gear strut gas chamber 30 is increased, for example, to provide desired characteristics, such as a desired operating pressure, strut length, and desired compressibility.

Subsequently, hydraulic fluid may be pumped via conduit 90 into the aft lock actuation cavity 18-1. In this manner, the aft lock actuation shaft 22 may mechanically drive the aft lock 23 to engage aft radial locking ring 24 into a corresponding aft locking groove 15 in piston member 28. The locking apparatus may lock the piston member 28 in the unshrunk position, so that any hydraulic forces or gas forces transmitted from the landing gear 20 may be reacted with the actuator body 29, thereby reducing wear on other system components, for example, with momentary reference to FIG. 1, conduit 80, conduit 90 and aircraft sequence valve 60.

Thus, with reference to FIGS. 2, 3, and 8, in various embodiments, to operate a landing gear actuator system 10 to place a landing gear in an unshrunk position (FIG. 3), from a shrunk position (FIG. 2), a method proceeds as follows. Ensure no pressure on conduit 80. Apply pressure to conduit 90 which communicates with forward lock actuation cavity 16-1 and aft lock actuation cavity 18-1 simultaneously. Pressure in forward lock actuation cavity 16-1 will move forward lock actuation shaft 21, which moves forward lock 25 and allows forward radial locking ring 26 to become disengaged from forward locking groove 13, thereby unlocking the forward (shrunk) lock. The pressure in aft lock actuation cavity 18-1 tries to move the aft lock actuation shaft 22 but it is stalled because aft lock 23 cannot move under aft radial locking ring 24 as it is trapped by the inside diameter of piston member 28. In the absence of pressure in conduit 80, the landing gear strut gas chamber 30 and gas storage reservoir 12 will expand as the strut and actuator move to the unshrunk position. This is accomplished via the landing gear strut shrink chamber 40 shrinking and transferring its fluid via conduit 100 into hydraulic fluid storage reservoir 17. Once the piston member 28 reaches the unshrunk position (FIG. 3), the continued pressure on conduit 90 (which is in communication with aft lock actuation cavity 18-1) will move aft lock actuation shaft 22 and force the aft lock 23 under aft radial locking ring 24 forcing it to engage aft locking groove 15 and lock the piston member 28 into the unshrunk position (FIG. 3).

Now, with reference to FIGS. 4 and 5, in various embodiments, landing gear actuator system 10 further comprises a strut gas pressure isolation valve 7. In various embodiments, a strut gas pressure isolation valve 7 further reduces wear on the landing gear actuator system 10, by isolating the landing gear strut gas chamber 30 from the gas storage reservoir 12, and consequently, reacting impulse and other load forces directly through the strut gas pressure isolation valve 7 with the actuator body 29, rather than permitting them to be transmitted to piston member 28. In various embodiments, this strut gas pressure isolation valve 7 isolates the gas storage reservoir 12 from pressure increases transmitted from the landing gear strut gas chamber 30. In various embodiments, this strut gas pressure isolation valve isolates the gas storage reservoir 12 from pressure decreases transmitted from the landing gear strut gas chamber 30. In various embodiments, this isolation valve isolates gas storage reservoir from pressure decreases and from pressure increases transmitted from the landing gear strut gas chamber 30.

Now, with particular focus on the stmt pressure isolation valve, a strut pressure isolation valve may comprise a gas transfer channel, a pressure aperture, a translatable sealing member, a trigger, and a spring. For example, with reference to FIGS. 4 and 5, a strut gas pressure isolation valve 7 may comprise a gas transfer channel 9, a translatable sealing member 4, a trigger 3, a spring 8, and a pressure aperture 6. In various embodiments, pressure aperture 6 is in fluid communication with gas storage reservoir 12. In various embodiments, pressure aperture 6 communicates pressure changes within gas storage reservoir 12 to translatable sealing member 4. In various embodiments, trigger 3, mechanically connects to translatable sealing member 4, and may be contacted by piston member 28. When piston member 28 contacts the trigger 3, trigger 3 moves translatable sealing member 4. In this manner, translatable sealing member 4 may be moved into and out of a sealing relationship, closing and opening gas transfer channel 9 from pressure aperture 6. For example, translatable sealing member 4 may be translated out of a sealing relationship, closing gas transfer channel 9 from pressure aperture 6. In this manner, gas transfer channel 9 may be sealed and out of communication with pressure aperture 6. Thus, the strut gas pressure isolation valve 7 may close and prohibit fluid communication between landing gear strut gas chamber 30 and gas storage reservoir 12. For further example, when piston member 28 draws away from trigger 3, and uncontacts the trigger 3, trigger 3 permits spring 8 to move translatable sealing member 4 into a non-sealing relationship with gas transfer channel 9. Thus, the strut gas pressure isolation valve 7 may open and permit fluid communication between landing gear strut gas chamber 30 and gas storage reservoir 12 or may close and prevent fluid communication between landing gear strut gas chamber 30 and gas storage reservoir 12. In this manner, strut gas pressure isolation valve 7 may close during times of contact by piston member 28 with trigger 3 and remain unreactive to pressure changes in landing gear strut gas chamber 30, but in the absence of contact by piston member 28 it remains open. Accordingly, strut gas pressure isolation valve 7 may isolate the landing gear strut gas chamber 30 from gas storage reservoir 12 when piston member 28 contacts the trigger 3. In various embodiments, spring 8 is disposed between translatable sealing member 4 and the actuator body 29, so that a sealing force is exerted on translatable sealing member 4, impelling the translatable sealing member 4 to allow communication with the landing gear strut gas chamber 30 unless contact by piston member 28 overcomes the spring force. In various embodiments, the strut pressure isolation valve further comprises a pilot pressure channel, whereby translatable sealing member 4 is exposed to a pilot pressure. For example, pilot pressure channel 27 may expose the translatable sealing member 4 to a pilot pressure, whereby the force exerted by spring 8 may be augmented or countered. For instance, in various embodiments, a pilot pressure may be exerted on translatable sealing member 4 sufficient to overcome any pressure inside gas storage reservoir 12. In this manner, the strut pressure isolation valve may be opened or closed without requiring contact between piston member 28 and trigger 3. In various embodiments, the surface area of translatable sealing member 4 exposed to the pilot pressure is larger than the surface area of trigger 3 exposed to the gas storage reservoir 12 such that in the absence of contact with piston member 28 and equal pressures inside the gas storage reservoir 12 and conduit 110 the pressure isolation valve will open.

Figure 6:
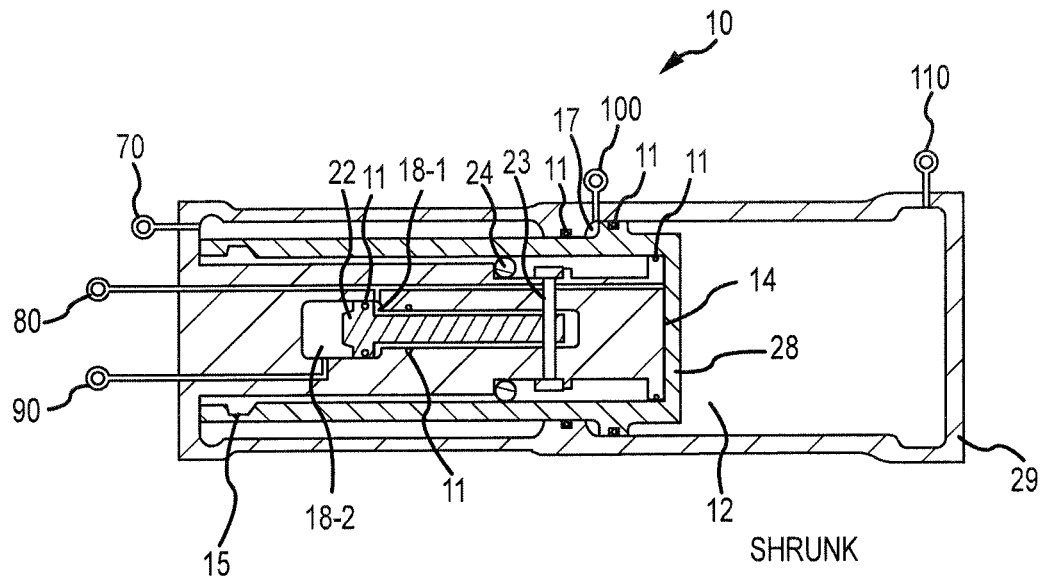
FIG. 6 illustrates a cut away view of various aspects of an actuator for a shrinking system for landing gear, in a shrunk configuration, in accordance with various embodiments.
Figure 7:
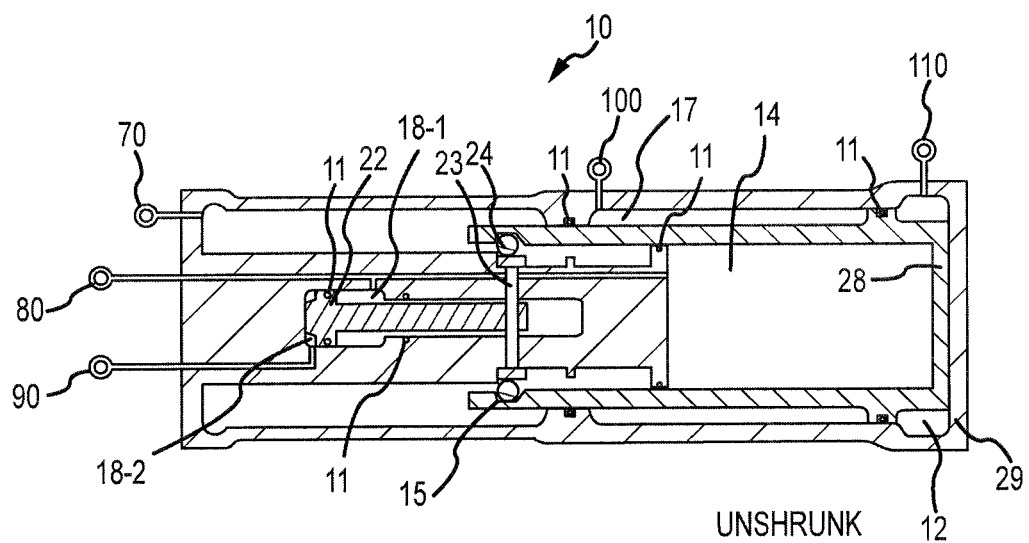
FIG. 7 illustrates a cut away view of various aspects of an actuator for a shrinking system for landing gear in a unshrunk configuration, in accordance with various embodiments.

Now, with reference to FIGS. 6 and 7, various other aspects of a landing gear actuator system 10 may be differently arranged in various embodiments. For example, a landing gear actuator system 10 may comprise differently arranged chambers so that the introduction of hydraulic fluid from an aircraft sequence valve 60 via conduit 80 does not shrink the landing gear (as in FIGS. 2 and 4), but instead unshrinks the landing gear, as discussed below. In various embodiments, landing gear actuator system 10 may comprise an actuator body, an operating apparatus, a gas pressure adjustment apparatus, and a hydraulic fluid adjustment apparatus wherein the gas pressure adjustment apparatus adjusts at least one gas pressure/volume and the hydraulic fluid adjustment apparatus adjusts at least one hydraulic fluid pressure/volume wherein each adjusting is in response to the operating apparatus, and wherein the gas pressure is adjusted inversely with respect to the hydraulic fluid pressure/volume.

For example, a landing gear actuator system 10 may comprise an actuator body, an operating apparatus comprising a hydraulic fluid drive reservoir, a hydraulic fluid adjustment apparatus comprising a hydraulic fluid storage reservoir, a gas pressure adjustment apparatus comprising a gas storage reservoir. An operating apparatus may further comprise a piston locking apparatus and a piston member, wherein the piston member separates the hydraulic fluid storage reservoir from the gas storage reservoir.

In various embodiments, the piston member 28 is actuated by the introduction of hydraulic fluid in to the hydraulic fluid drive reservoir 14. However, in embodiments according to FIGS. 6 and 7, the introduction of this fluid causes the piston member 28 to actuate in an opposite direction than according to FIGS. 3 and 4. In various embodiments, the piston locking apparatus is disposed within the actuator body and locks and unlocks the piston member at one or more orientations, for example, fully extended, fully retracted, or both.

Now, with particular reference to FIGS. 6 and 7, in various embodiments, hydraulic fluid drive reservoir 14 may be positioned within a portion of piston member 28 so that piston member 28 is positioned annually about a circumferential portion of hydraulic fluid drive reservoir 14. For example, hydraulic fluid drive reservoir 14 may be positioned within a cavity disposed within piston member 28. Accordingly, when hydraulic fluid drive reservoir 14 is filled, hydraulic pressure may be exerted on piston member 28 and push the piston member 28 forward to a fully forward (unshrunk) position as illustrated in FIG. 7. One having ordinary skill in the art will appreciate the difference between this embodiment, and the embodiment disclosed in FIGS. 3 and 5 in which hydraulic fluid drive reservoir 14 may be positioned annually about an circumferential portion of piston member 28 so that when hydraulic fluid drive reservoir 14 is filled, hydraulic pressure may be exerted on piston member 28 and draw the piston member 28 aft to a fully aft (shrunk) position as illustrated in FIGS. 2 and 4. In accordance with various embodiments and with additional reference to FIG. 1, a landing gear actuator system 10 according to FIGS. 6 and 7 may additionally comprise a strut gas pressure isolation valve 7 (as illustrated in FIGS. 4 and 5).

Moreover, with reference to FIGS. 6 and 7, various arrangements of locks may be implemented. For example, rather than a forward lock and an aft lock, with reference to FIGS. 6 and 7, various embodiments may incorporate only a forward lock, or only an aft lock. For example, various embodiments may incorporate only an aft lock 23 (e.g., an unshrunk lock). For example, the ratios of the volumes of various chambers may be designed so that the landing gear actuator system 10 only necessitates locking of piston member 28 at the unshrunk position, rather than at both the shrunk and unshrunk position. Thus, with reference to FIG. 6, a piston member 28 is illustrated unlocked in the shrunk position, and with reference to FIG. 7, a piston member 28 is illustrated locked in the unshrunk position.

Thus, in various embodiments, the piston locking apparatus comprises an aft lock actuation shaft 22, wherein the aft lock actuation shaft 22 mechanically communicates with aft lock 23. In various embodiments, aft lock actuation shaft 22 mechanically drives the aft lock 23 to dispose an aft radial locking ring 24 into a corresponding aft locking groove 15 in piston member 28. In this manner, by controlling the lock actuation shafts, via hydraulic fluid conducted from aircraft sequence valve 60 through conduit 90 and/or conduit 80, to landing gear actuator system 10, the lock may be engaged whereby the piston may be locked in position at its forward most (unshrunk) position, for example by an aft lock 23 so that gas storage reservoir 12 is minimized. In various embodiments, additional locks may be implemented, or different locking grooves may be implemented, whereby the piston may be locked in a variety of different positions, for example, to achieve different landing gear extensions, and different landing gear gas pressures.

In various embodiments, the ratios of the volumes of various reservoirs/cavities may be designed differently to effect different behaviors. For example, with reference to FIGS. 1-8, in various embodiments, the stroke of the landing gear strut shrink chamber 40 during a shrink event (S1) multiplied by the area of the gas charge in the landing gear strut gas chamber 30 during a shrink event (A1) comprises a stroke volume of the landing gear strut (V1). In various embodiments, the stroke of the gas storage reservoir 12 being stroked during a shrink event (S2) multiplied by the area of the gas charge in the gas storage reservoir 12 (A2) comprises a stroke volume of a shrink actuator chamber (V2).

In various embodiments, V1 is greater than V2 so that the stroke volume of the landing gear strut shrink chamber 40 is greater than the available volume to accept the gas in the gas storage reservoir 12. This means that the overall system gas volume decreases during a shrink event and the shrink actuator must be locked in the shrunk condition to prevent unintended unshrink. When in the unshunk condition, the aircraft may land, and the gas pressure may attempt to drive the piston member 28 into the shrunk condition, so that a lock at the unshrunk condition is also required. Thus, a lock is provided at the unshunk position and at the shrunk position. This configuration requires the aircraft hydraulic power to drive the actuator and strut to the shrunk position. Similarly, in various embodiments V1 may be equal to V2.

In various embodiments, V1 is less than V2 so that the stroke volume of the landing gear strut shrink chamber 40 is less than the available volume to accept the gas in the gas storage reservoir 12. This means that the overall system gas volume increases during a shrink event. Accordingly, when the strut is shrunk, the increase in available volume occupied by the gas transferred from V1 to V2 causes the pressure in the strut to be lower than the initial pressure. Accordingly, the shrink actuator needs to locked in the unshrunk condition to prevent unintended shrink. When in the unshrunk condition, the aircraft may land and the stroking of the strut may cause an increase in gas pressure which tries to drive the piston member 28 into the shrunk condition. Thus a lock in the unshrunk position is required, while no lock in the shrunk position is required. This configuration requires aircraft hydraulic power to drive the actuator and strut to the unshrunk position.

In various embodiments, the area of the hydraulic fluid drive reservoir 14 is minimized as much as practical while still providing adequate margin to minimize the aircraft system reservoir size and flow requirements during shrink actuator operation.

Thus, as one having ordinary skill in the art will appreciate, an exemplary embodiment of a shrinking system for landing gear may comprise combinations of various features from various example embodiments disclosed herein. For example, an exemplary embodiment of a shrinking system for landing gear may comprise an actuator comprising an operating apparatus comprising a hydraulic fluid drive reservoir according to FIGS. 2 and 3, or according to FIGS. 6 and 7, or according to various other arrangements adapted to drive the piston, for example, according to a combination of that disclosed in FIGS. 2 and 3 and that disclosed in FIGS. 6 and 7. Similarly, an exemplary embodiment of a shrinking system may include a strut pressure isolation valve according to FIGS. 4 and 5; for example, the exemplary embodiment according to FIGS. 6 and 7 may comprise the isolation valve according to FIGS. 4 and 5. These and another combinations, arrangements, and embodiments of features disclosed herein are possible, as appreciated by one having ordinary skill in the art. Moreover, a strut pressure isolation valve may be combined with various other apparatuses and systems. Exemplary apparatuses and systems disclosed in U.S. Pat. No. 5,908,174, entitled Automatic Shrink Shock Strut for an Aircraft Landing Gear are incorporated by reference.

Now, having described various components of various exemplary landing gear shrinking systems, a landing gear shrinking system may be manufactured from various materials. In one exemplary embodiment, a landing gear shrinking system may comprise metal. For example, a landing gear shrinking systems may comprise metal, such as titanium, aluminum, steel, or stainless steel, though it may alternatively comprise numerous other materials configured to provide support, such as, for example, composite, ceramic, plastics, polymers, alloys, glass, binder, epoxy, polyester, acrylic, or any material or combination of materials having a desired strength, stiffness, or flexibility sufficient to maintain resiliency during use. In various embodiments, various portions of landing gear shrinking systems as disclosed herein are made of different materials or combinations of materials, and/or may comprise coatings.

In various embodiments, landing gear shrinking systems may comprise multiple materials, or any material configuration suitable to enhance or reinforce the resiliency and/or support of the system when subjected to wear in an aircraft operating environment or to satisfy other desired electromagnetic, chemical, physical, or biological properties, for example radar signature, load capacity, or heat tolerance.

In various embodiments, while the landing gear shrinking systems described herein have been described in the context of aircraft applications; however, one will appreciate in light of the present disclosure, that the system described herein may be used in connection with various other vehicles, for example, cars, trucks, busses, trains, boats, and submersible vehicles, or any other vehicle or device, having a shock absorbing strut.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A landing gear actuator system comprising:
   an actuator body;
   an operating apparatus comprising a hydraulic fluid drive reservoir and a piston member, wherein the piston member is translatable in response to an introduction of hydraulic fluid in the hydraulic fluid drive reservoir;
   a gas pressure adjustment apparatus comprising a gas storage reservoir;
   a hydraulic fluid adjustment apparatus,
      wherein the gas pressure adjustment apparatus adjusts a gas volume in response to the operating apparatus,
      wherein the hydraulic fluid adjustment apparatus adjusts a hydraulic fluid volume in response to the operating apparatus, and
      wherein the gas volume and the hydraulic fluid volume are adjusted inversely; and
   a strut gas pressure isolation valve in fluid communication with the gas pressure adjustment apparatus, wherein the strut gas pressure isolation valve is configured to isolate the gas storage reservoir from a landing gear strut gas chamber, wherein the strut gas pressure isolation valve is configured to be closed by contact between the piston member and a trigger.

2. The landing gear actuator system according to claim 1,
   wherein the hydraulic fluid adjustment apparatus
   wherein the piston member is disposed between the hydraulic fluid storage reservoir and the gas storage reservoir such that a translation of the piston member inversely changes a volume of the hydraulic fluid storage reservoir and a volume of the gas storage reservoir with respect to one another.

3. The landing gear actuator system according to claim 2, wherein the operating apparatus comprises a piston locking apparatus disposed within the actuator body and oriented to lock the piston member in a fixed position.

4. The landing gear actuator system according to claim 3, wherein the piston locking apparatus comprises a forward lock and an aft lock.

5. The landing gear actuator system according to claim 2, wherein the hydraulic fluid drive reservoir is positioned annularly about a circumferential portion of the piston member.

6. The landing gear actuator system according to claim 2, wherein the piston member is positioned annularly about a circumferential portion of the hydraulic fluid drive reservoir wherein the hydraulic fluid drive reservoir is disposed within a cavity of the piston member.

7. The landing gear actuator system according to claim 2, wherein the hydraulic fluid drive reservoir is positioned so that filling the hydraulic fluid drive reservoir with hydraulic fluid translates the piston member such that the volume of the hydraulic fluid storage reservoir is increased and the volume of the gas storage reservoir is decreased in response to the filling.

8. The landing gear actuator system according to claim 2, wherein the hydraulic fluid drive reservoir is positioned so that filling the hydraulic fluid drive reservoir with hydraulic fluid translates the piston member such that the volume of the hydraulic fluid storage reservoir is decreased and the volume of the gas storage reservoir is increased in response to the filling.

9. The landing gear actuator system according to claim 2, further comprising:
   a landing gear comprising:
      a landing gear strut shrink chamber adapted to at least one of shrink and unshrink the landing gear; and
      the landing gear strut gas chamber adapted to provide support for the landing gear.

10. The landing gear actuator system according to claim 1, further comprising an aircraft sequencer valve wherein the aircraft sequencer valve controls a flow of hydraulic fluid to the operating apparatus.

11. A method comprising:
    actuating a piston member of an actuator system in response to an introduction of hydraulic fluid into a hydraulic fluid drive reservoir of the actuator system;
    moving hydraulic fluid between a landing gear strut shrink chamber and a hydraulic fluid storage reservoir of the actuator system in response to the actuating;
    moving gas between a gas storage reservoir of the actuator system and a landing gear strut gas chamber in response to the actuating;
    causing a landing gear strut to at least one of shrink and unshrink in response to the actuating: and
    isolating, by a strut gas pressure isolation valve, the gas storage reservoir from the landing gear strut gas chamber during unshrink of the landing gear strut by mechanically triggering the strut gas pressure isolation valve with the piston member.

12. The method according to claim 11, further comprising engaging a piston locking apparatus of the actuator system to lock the piston member in a fixed position.

13. The method according to claim 11, further comprising disengaging a piston locking apparatus of the actuator system to unlock the piston member from a fixed position prior to the actuating.

14. The method according to claim 11 further comprising:
    disengaging a piston locking apparatus of the actuator system to unlock the piston member from a first fixed position prior to the actuating; and
    engaging the piston locking apparatus to lock the piston member in a second fixed position.

* * * * *